United States Patent [19]

Street

[11] Patent Number: 5,350,955
[45] Date of Patent: Sep. 27, 1994

[54] APPARATUS FOR POSITION DETECTION AND VERIFICATION THEREOF USING PULSE PATTERNS HAVING SEQUENTIALLY UNIQUE PROPERTIES

[75] Inventor: Thomas Street, Southgate, Mich.

[73] Assignee: Rockwell International Corporation, Pittsburgh, Pa.

[21] Appl. No.: 924,122

[22] Filed: Aug. 3, 1992

[51] Int. Cl.$^5$ .............................................. G01P 3/22
[52] U.S. Cl. ..................................... 307/515; 324/160
[58] Field of Search ................ 307/515; 324/160, 161, 324/176, 178, 180

[56] References Cited

U.S. PATENT DOCUMENTS

| | | | |
|---|---|---|---|
| 4,214,483 | 7/1980 | Young | 324/160 X |
| 4,427,970 | 1/1984 | Devol | 324/160 X |
| 4,626,699 | 12/1986 | Oesterle et al. | 324/180 X |
| 4,641,519 | 2/1987 | Klein et al. | 324/160 X |
| 4,788,497 | 11/1988 | Katsumura | 324/160 X |
| 4,839,646 | 6/1989 | Tyson | 324/160 X |

*Primary Examiner*—Willis R. Wolfe

[57] ABSTRACT

An apparatus for position detection using pulse patterns created by use of a fixed disk having three conductive patterns disposed thereon. The first and second patterns are annular conductive paths which are coaxial with respect to one another and the third pattern consists of radially extending conductive portions which are electrically connected to the second pattern. A brush carried by a rotating member whose position is sought to be determined is maintained in contact with the first and third pattern. In this manner an electrical signal variation is encountered as the radially extending conductive portions are encountered by the brush upon rotation thereof. This variation is thus correlated to the pattern defined on the third pattern. A microprocessor is used to add and subtract pulses as the brush is rotated from a reference position. Circumferentially sequential radially extending conductive portions of said third pattern are arranged into subgroups which provide a unique signature corresponding to the respective position. A sorted positional value is updated as rotation is initiated and after sufficient rotation has occurred to identify a subgroup, a comparison is performed to detect the presence of error. If no error is present the position will continue to be updated y adding and subtracting pulses. If an error is detected, the new subgroup and pulse position therein will be accepted as the correct positional value.

15 Claims, 2 Drawing Sheets

APPARATUS FOR POSITION DETECTION AND VERIFICATION THEREOF USING PULSE PATTERNS HAVING SEQUENTIALLY UNIQUE PROPERTIES

BACKGROUND OF THE INVENTION

1. Field of the Invention

This invention relates to position detecting apparatus and, more specifically, to position detecting apparatus using a unique pulse pattern to define and continuously verify a respective position detection.

2. Description of the Related Art

In many control applications it is necessary to know the position of a movable portion of the system. Several methods have been used to accomplish such an objective. A first group of methods provides an absolute position of the system at any given point. These sensors typically utilize a potentiometer which provides a resistance value corresponding to a specific position. The advantage of this type of system is that there is no loss of reference such that the system requires calibration. A second group of position sensors are relative in nature. These systems have a zero or calibration point and generate pulses as the system moves from this point of calibration. The system position is determined by adding or subtracting the pulses that are encountered or generated as the system moves from the zero position. Typically, these pulses are provided by use of a hall effect sensor, an optical sensor or a make-or-break switch configuration. The advantage of such a system is its simplicity over the absolute sensors. The disadvantage is that if the pulses are counted in the wrong direction, the system will not correctly correspond to the position indicated. Another disadvantage is that if a stored position is incorrect, the system has no means of self calibration to provide continuous error correction.

SUMMARY OF THE PRESENT INVENTION

The present invention includes an apparatus for position detection using pulse patterns created by use of a fixed disk having three conductive patterns disposed thereon. The first and second patterns are annular conductive paths which are coaxial with respect to one another and the third pattern consists of radially extending conductive portions which are electrically connected to the second pattern. A brush carried by a rotating member whose position is sought to be determined is maintained in contact with the first and third pattern. In this manner an electrical signal variation is encountered as the radially extending conductive portions are encountered by the brush upon rotation thereof. This variation is thus correlated to the pattern defined on the third pattern. A microprocessor is used to add and subtract pulses as the brush is rotated from a reference position. Circumferentially sequential radially extending conductive portions of said third pattern are arranged into subgroups which provide a unique signature corresponding to the respective position. A stored positional value is updated as rotation is initiated and after sufficient rotation has occurred to identify a subgroup, a comparison is performed to detect the presence of error. If no error is present the position will continue to be updated adding and subtracting pulses. If an error is detected, the new subgroup and pulse position therein will be accepted as the correct positional value.

These and other aspects of the present invention will become more readily apparent by reference to the following detailed description of the embodiments as shown in the drawings.

DETAILED DESCRIPTION OF THE PREFERRED EMBODIMENT

Figure 1:
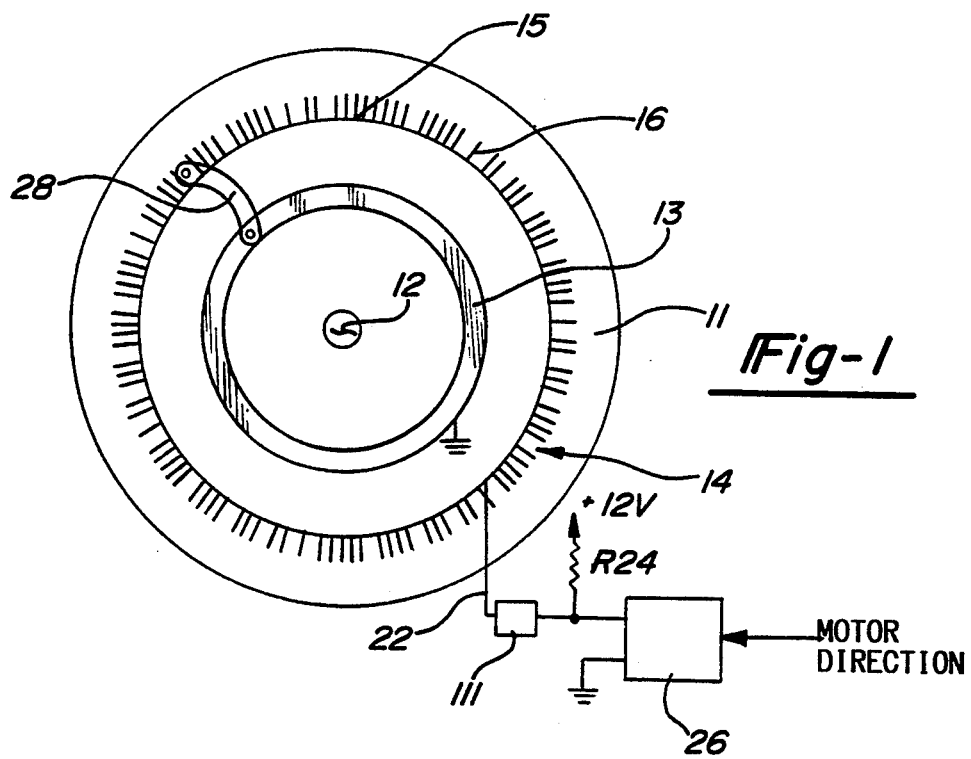
FIG. 1 is a plan view of the sensor used to determine position of a rotary shaft.
Figure 2:
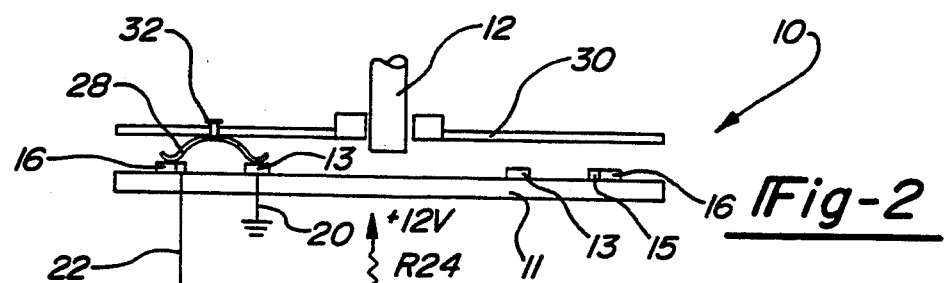
FIG. 2 is a side view of the sensor used to determine position of a rotary shaft.
Figure 3:
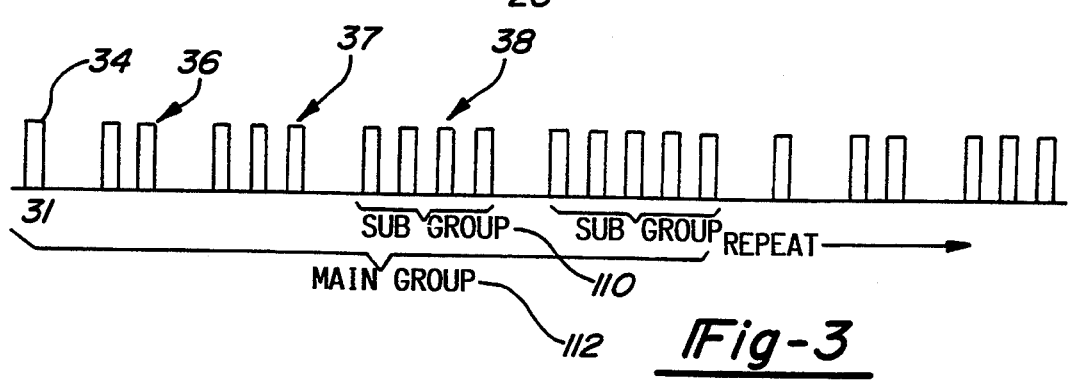
FIG. 3 is a pulse pattern produced upon rotation of the disk of FIG. 1.

The preferred embodiment of the present invention, as shown in FIG. 1 and FIG. 2, comprises a sensor 10 defined as a generally radially extending surface 11 fixed rigidly with respect to rotatable shaft 12. Surface 11 includes a first and second pattern 13, 14 defined thereon. First pattern 13 is an annular conductive portion of surface 11. A second coaxial annular pattern 14 comprises a first portion 15 being annular and a second portion 16 comprising a pattern of radially extending conductive portions appearing in subgroups. Each subgroup offering a sequentially unique signature typically distinguished as an incremental radially extending portion. The groups are divided into subgroups and main groups as shown in FIG. 3. The radially extending surface 11 is preferably constructed of an insulating material providing a high dielectric strength. The respective patterns are formed of a conductive coating which may be silk screened thereon or applied using known techniques of decalcomania. A first connection 20 known to those skilled in the art as a typical soldered connection provides electrical communication with first pattern 13 connecting same to a system ground. A second connection 22 connects annular portion 15 of the second pattern 14 to a 12 volt source through resistor R24. A low pass filter 111 is incorporated to eliminate any unwanted signal distortion due to brush contact discontinuity from bounce or dirt. Microprocessor 26 monitors voltage variation at point A. A brush 28 is connected to rotary disk 30 by pin 32 and maintained in electrical continuity between portion 16 of pattern 14 and pattern 13. Brush 28 is a conventional sliding commutating brush which is well known to those skilled in the art. Such a system may be used to generate a pulse pattern illustrated in FIG. 3 which includes a reference position shown as 31 comprising a first single pulse 34 spaced from a sequentially appearing pair of pulses comprising subgroup 36, spaced from a sequentially appearing set of three pulses comprising subgroup 37 spaced sequentially from a fourth set of pulses comprising subgroup 38. Pulse 34 and subgroup 36, 37, 38 collectively comprise a main group 112 which may be repeated about the perimeter of surface 11 or alternatively may appear as a singular main group 114 comprising unique subgroups each featuring an incremental pulse thereby providing a distinction from a sequentially preceding subgroup. Each sequential pulse and subgroups thereof produces a unique signatured signal appearing as a respective group of voltage variations which provides a correlation to a specific location of rotary displacement. Such pulse patterns are produced as a voltage variation as disk 30 carries brush 28 over the patterns defined on surface 11.

Figure 4:
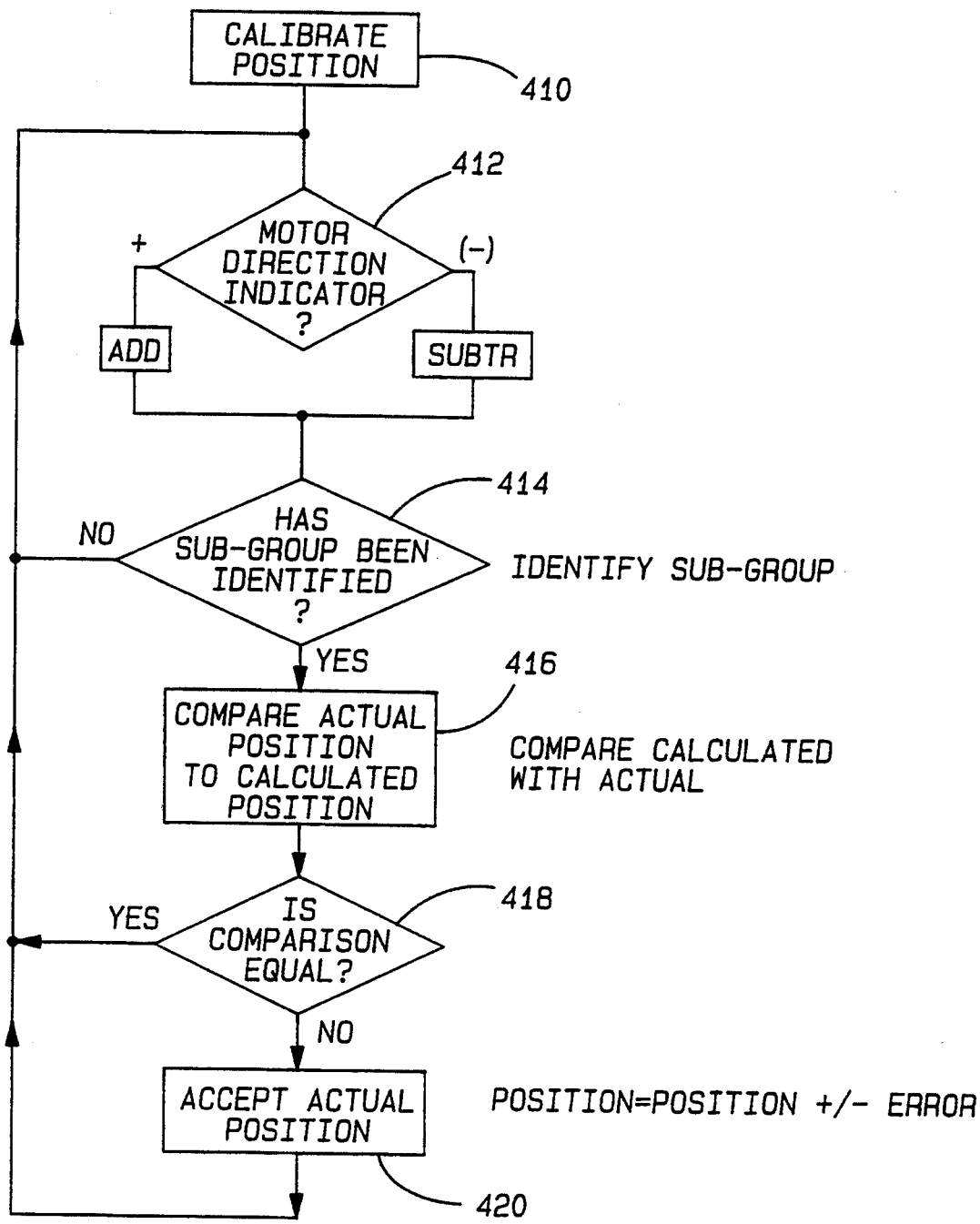
FIG. 4 is a flow chart of the operational characteristics of the present invention.

Using the pulse pattern generated by the preferred embodiment of the present invention, it is possible to continuously verify the positional accuracy of a determined position of a rotatable shaft by comparisons of calculated positions with actual monitored positions. The system position can be determined by counting the pulses encountered as the shaft is rotated from reference position 31. Each sequential subgroup of pulses will provide a unique signature consisting of the number of pulses present therein. The signature corresponds with a respective rotary position. Corrections are made when an error is detected by accepting the pattern which is received. For example, if the system has determined that it is on pulse two of a subgroup of three pulses and by counting pulses it determines that it was in fact on pulse one of a subgroup of three, the system can adjust itself to correct the mistaken location. The system is initially calibrated by establishing a known position. Such a position may be an automobile window in closed position forced against a seal. Such a position is referred to as the calibrate position step 410 of FIG. 4. Movement from this position produces pulses which are counted and either added or subtracted in step 412. Once a subgroup has been identified in step 414, positional calculation determined in step 412 is compared in step 416 with the known position of the respective identified subgroup. If the calculated and monitored positions are identical, no error correction is made and the calculated position is verified. If not, position correction is made in step 420 accepting the monitored position. The system is also capable of determining direction of motion by the order in which the pulse groups are generated. That is; if the pulse groups are counting up or down, the direction is known from the sequence in which they appear. Finally, the velocity of the system can be determined by measuring the period of a pulse as the pulses are generated by the system. The preferred embodiment of the present invention incorporates a Motorola 68HC05P7 microcontroller. When programmed in machine language implementing the flow chart of FIG. 4, the present invention provides an inexpensive and reliable sensor capable of monitoring the rotary position of a system component.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. An apparatus for detecting the rotary position of a shaft, comprising:
   a radially extending member (11) fixed with respect to said shaft (12);
   said member (11) having a dielectric surface;
   a first annular portion (13) disposed on said surface defining a continuous conductive path formed coaxial to said rotary shaft (12);
   a second annular portion (15) disposed on said surface defining a conductive path coaxial to said first annular portion (13);
   a third annular portion disposed on said surface including spaced radially extending conductive portions (16);
   wherein said radially extending portions of said third portion comprise a first such subgroup including one radially extending portion sequentially followed by a second subgroup including two radially extending portions and said first subgroup and said second subgroup repeat to form a complete pattern about said third portion;
   said second and said third portions disposed in electrically conductive connection to one another;
   first means for conductive connection (20) to said first annular portion and ground potential;
   second means for conductive connection (22) to said second annular portion;
   third means for slidable conductive connection (28) between said first annular portion (13) and said third annular portion 16 and drivingly connected to said shaft (12) for rotation therewith; and
   means for providing a voltage potential to said second annular portion through said second means for conductive connection (22).

2. The invention of claim 1 wherein said radially extending member is constructed from ceramic.

3. The invention of claim 1 wherein said first, second and third portions comprise a chemically etched conductive layer.

4. The invention of claim 1 wherein said first, second and third portions comprise metallic stampings.

5. The invention of claim 1 wherein said third connecting member is a commutating brush.

6. The invention of claim 1 wherein said means for addition and subtraction of occurrence of said variation in said voltage potential comprises a microprocessor.

7. An apparatus for detecting the position of a system component having a position dependent upon a force means input through a shaft, comprising:
   a circular member, disposed coaxial to said shaft and fixed with respect thereto;
   a first annular portion disposed on said surface defining a continuous conductive path formed coaxial to said rotary shaft;
   a second annular portion disposed on said surface defining a conductive path coaxial to said first annular portion;
   a third annular portion disposed on said surface including circumferentially spaced radially extending conductive portions;
   said second and said third portions disposed in conductive relation to one another;
   a first connecting member providing an electrically conductive connection to said first annular portion and connecting said first annular portion to ground potential;
   a second connecting member providing a conductive connection to said second annular member and connecting said second annular portion to a voltage potential;
   a third means for slidable conductive connection between said first annular portion and said third annular portion and drivingly connected to said shaft;
   said radially extending portions of said third portion sequentially disposed from one another in discrete groups which produce sequentially unique variations in said voltage potential as said sequentially disposed portions are encountered by said third means for slidable conductive connection and said unique variations correspond to respective rotary positions;

means for determining a rotary position of said shaft changed from an initial position by addition and subtraction of said unique variations in said voltage potential;

means for detecting errors in said rotary position by comparing a rotary position defined by said means for determining a rotary position with a rotary position corresponding to detection of unique variations in said voltage potential and updating said rotary position to correspond to said rotary position corresponding to detection of unique variations in said voltage potential.

8. The invention of claim 7 wherein said circular member is constructed from ceramic.

9. The invention of claim 7 wherein said first, second and third portions are metal stamping.

10. The invention of claim 7 wherein said first, second and third portion comprise a chemically etched conductive surface.

11. The invention of claim 7 wherein said third means for slidable conductive connection comprise brushes.

12. The invention of claim 7 wherein said means for determining a rotary position of said shaft comprises a microprocessor.

13. The invention of claim 7 wherein said radially extending portions of said third portion are organized into groups, each sequential group having an incremental radially extending portion whereby each group produces a group of pulses differentiable from the preceding group.

14. The invention of claim 7 wherein said radially extending portions of said third portion comprise a first group including one radially extending portion sequentially followed by a second group including two radially extending portions.

15. The invention of claim 7 wherein said radially extending portions of said third portion comprise a first group including one radially extending portion sequentially followed by successive groups comprising radially extending portions wherein each successive group includes an additional radially extending portion.

* * * * *